US011989886B2

(12) United States Patent
Bhatt et al.

(10) Patent No.: US 11,989,886 B2
(45) Date of Patent: May 21, 2024

(54) AUTOMATED UNSUPERVISED LOCALIZATION OF CONTEXT SENSITIVE EVENTS IN CROPS AND COMPUTING EXTENT THEREOF

(71) Applicant: Tata Consultancy Services Limited, Mumbai (IN)

(72) Inventors: Prakruti Vinodchandra Bhatt, Thane West (IN); Sanat Sarangi, Thane West (IN); Srinivasu Pappula, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 379 days.

(21) Appl. No.: 17/371,650

(22) PCT Filed: Feb. 7, 2020

(86) PCT No.: PCT/IN2020/050124
§ 371 (c)(1),
(2) Date: Jul. 9, 2021

(87) PCT Pub. No.: WO2020/165913
PCT Pub. Date: Aug. 20, 2020

(65) Prior Publication Data
US 2022/0122347 A1    Apr. 21, 2022

(30) Foreign Application Priority Data
Feb. 12, 2019  (IN) .............................. 201921005556

(51) Int. Cl.
*G06T 7/136* (2017.01)
*G06T 7/00* (2017.01)
(Continued)

(52) U.S. Cl.
CPC ............ *G06T 7/136* (2017.01); *G06T 7/0012* (2013.01); *G06T 7/11* (2017.01); *G06T 7/174* (2017.01);
(Continued)

(58) Field of Classification Search
CPC ........ G06V 10/95; G06V 10/82; G06V 20/68; G06V 20/188; G06V 10/26; G06V 10/764;
(Continued)

(56) References Cited

U.S. PATENT DOCUMENTS 9,443,314 B1    9/2016  Huang et al.
2014/0036054 A1*  2/2014  Zouridakis ............ G06T 7/0012
                                                            382/110
(Continued)

FOREIGN PATENT DOCUMENTS

CN    103778628 A  *  5/2014
CN    103778628 A     5/2014
(Continued)

OTHER PUBLICATIONS

A. Kanezaki, "Unsupervised Image Segmentation by Backpropagation," 2018 IEEE International Conference on Acoustics, Speech and Signal Processing (ICASSP), Calgary, AB, Canada, 2018, pp. 1543-1547, doi: 10.1109/ICASSP.2018.8462533. (Year: 2018).*

(Continued)

*Primary Examiner* — Emily C Terrell
*Assistant Examiner* — Julia Z. Yao
(74) *Attorney, Agent, or Firm* — Finnegan, Henderson, Farabow, Garrett & Dunner, LLP (57) ABSTRACT

Existing techniques in precision farming comprise supervised event detection and need labeled training data which is tedious considering the large number of crops, differences therein and even larger number of diseases and pests. The (Continued)

present disclosure provides an unsupervised method and uses images of any size captured in an uncontrolled environment. The methods and systems disclosed find application in automatically localizing and classifying events, including health state and growth stage and also estimating an extent of manifestation of the event. Information of spatial continuity in pixels and boundaries in a given image is used to update the feature representation and label assignment to every pixel using a fully convolutional network. Back propagation of the pixel labels modified according to the output of a graph based method helps the neural network to converge and provide a time efficient solution.

19 Claims, 6 Drawing Sheets

(51) Int. Cl.

| | | |
|---|---|---|
| G06T 7/11 | (2017.01) | |
| G06T 7/174 | (2017.01) | |
| G06V 10/26 | (2022.01) | |
| G06V 10/764 | (2022.01) | |
| G06V 10/77 | (2022.01) | |
| G06V 10/776 | (2022.01) | |
| G06V 10/82 | (2022.01) | |
| G06V 10/94 | (2022.01) | |
| G06V 20/68 | (2022.01) | |

(52) U.S. Cl.
CPC ............ *G06V 10/26* (2022.01); *G06V 10/764* (2022.01); *G06V 10/7715* (2022.01); *G06V 10/776* (2022.01); *G06V 10/82* (2022.01); *G06V 10/95* (2022.01); *G06V 20/68* (2022.01); *G06T 2207/20081* (2013.01); *G06T 2207/20084* (2013.01); *G06T 2207/30188* (2013.01); *G06T 2207/30242* (2013.01)

(58) Field of Classification Search
CPC . G06T 2207/20084; G06T 2207/20081; G06T 2207/30188; G06T 7/136; G06N 3/084; G06N 3/088; Y02A 40/10; G06Q 50/02
See application file for complete search history.

(56) References Cited

U.S. PATENT DOCUMENTS

| | | | |
|---|---|---|---|
| 2015/0003725 A1 | 1/2015 | Wan | |
| 2016/0171407 A1* | 6/2016 | Jagyasi | G06Q 50/01 705/7.23 |
| 2016/0223506 A1* | 8/2016 | Shriver | G06T 7/001 |
| 2018/0322344 A1 | 11/2018 | Shriver et al. | |
| 2018/0330166 A1* | 11/2018 | Redden | G06V 20/188 |
| 2020/0320682 A1* | 10/2020 | Alexander | G06N 3/08 |

FOREIGN PATENT DOCUMENTS

| | | |
|---|---|---|
| CN | 106651886 A | 5/2017 |
| CN | 108364300 A | 8/2018 |
| WO | WO 2018/087546 A1 | 5/2018 |

OTHER PUBLICATIONS

Chen et al., "DeepLab: Semantic Image Segmentation with Deep Convolutional Nets, Atrous Convolution, and Fully Connected CRFs," 2016, in Computing Research Repository (CoRR), abs/1606.00915 (Year: 2017).*

Wang et al., "Superpixel segmentation: A benchmark," 2017, Signal Processing: Image Communication, vol. 56, pp. 28-39, https://doi.org/10.1016/j.image.2017.04.007 (Year: 2017).*

Hamuda et al., "A survey of image processing techniques for plant extraction and segmentation in the field," 2016, Computers and Electronics in Agriculture, vol. 125, pp. 184-199, https://doi.org/10.1016/j.compag.2016.04.024 (Year: 2016).*

Rizk, Hashem. Automated early plant disease detection and grading system: Development and implementation. 2017. American University in Cairo, Master's Thesis. AUC Knowledge Fountain. (Year: 2017).*

Bhatt et al., "Comparison of CNN models for application in crop health assessment with participatory sensing," 2017 IEEE Global Humanitarian Technology Conference (GHTC), San Jose, CA, USA, 2017, pp. 1-7, doi: 10.1109/GHTC.2017.8239295. (Year: 2017).*

Gadde et al., "Superpixel Convolutional Networks using Bilateral Inceptions," Computer Vision and Pattern Recognition (2016).

Moriya et al., "Unsupervised Segmentation of 3D Medical Images Based on Clustering and Deep Representation Learning," Computer Vision and Pattern Recognition (2018).

Paranjape et al., "Convolutional Networks in Scene Labelling," (2015).

* cited by examiner

AUTOMATED UNSUPERVISED LOCALIZATION OF CONTEXT SENSITIVE EVENTS IN CROPS AND COMPUTING EXTENT THEREOF

PRIORITY CLAIM

This application is a U.S. National Stage Filing under 35 U.S.C. § 371 and claims priority from International Application No. PCT/IN2020/050124, filed on Feb. 7, 2020, which application claims priority under 35 U.S.C. § 119 from Indian Application No. 201921005556, filed on Feb. 12, 2019. The entire contents of the aforementioned application are incorporated herein by reference.

TECHNICAL FIELD

The disclosure herein generally relates to image processing for precision farming, and, more particularly, to systems and computer implemented methods for automated unsupervised localization of context sensitive events in crops and computing extent of the events.

BACKGROUND

Developing an automated yet a generalized system that performs a start to end monitoring of various crops from sowing to harvest is a challenge due to a lot of variations among crops and within a particular crop. Automating tasks like flagging unwanted events like diseases, pests and marking the growth in terms of flowers and fruits while calibrating the various growth stages using a simple RGB camera is the need of the hour due to labor shortage and need to increase the yield given limited resources due to increasing population. Majority of farmers still depend on human inspection and expert knowledge, the availability of which is diminishing now. Existing applications in the literature target classification and detection of certain diseases or pests on a particular crop with custom-developed models. For example, certain applications identify flowers or fruits in an image from the set for which they have been trained. There are applications that can count certain fruit on the tree and give yield estimate for which they have been trained. These individual applications do not have a common unified approach that help in temporal as well as spatial monitoring of the crops as well as get such quantitative measures in a more generalized way. Apart from detection of an event (e.g. disease manifestation, flowering, change in the plant), it is important to know the growth stage of the crops or the severity of the disease in the detected area. Quantitative information is necessary for taking important decisions in a farm. Localization of events on a plant as well as position in the field are also important aspects of automated crop monitoring. Widely used methods of image segmentation are fully supervised i.e. they need a training data that is labeled at pixel level which is a tedious job considering large number of crops, differences within the crops and even larger number of diseases and pests. A prior art that uses unsupervised segmentation relies on feature clustering method to train a neural network and segment 3D images.

SUMMARY

Embodiments of the present disclosure present technological improvements as solutions to one or more of the above-mentioned technical problems recognized by the inventors in conventional systems.

In an aspect, there is provided a processor implemented method comprising the steps of: receiving an image from a temporal set of images of at least a portion of one or more crops being monitored for a pre-defined event; detecting one or more Regions Of Interest (ROIs) as localized bounding boxes in the received image based on the pre-defined event using one or more context sensitive pre-trained models associated with the pre-defined event for the one or more crops being monitored, wherein the one or more ROIs correspond to a detected event; performing unsupervised segmentation of the one or more ROIs using a Convolutional Neural Network (CNN) to obtain a segmentation map having predicted labels based on spatial continuity of pixels comprised within each of the ROIs; obtaining superpixels from the received image using a superpixel generating algorithm; and iteratively auto-correcting the obtained segmentation map by: updating labels of the pixels in the one or more ROIs using boundaries of the obtained superpixels; computing a cross entropy loss between the predicted labels by a last convolution layer of the CNN and the updated labels; and back propagating the computed cross entropy loss to the CNN, until a change in the cross entropy loss from a previous iteration is less than a predetermined threshold.

In another aspect, there is provided a system comprising: one or more data storage devices operatively coupled to one or more hardware processors and configured to store instructions configured for execution by the one or more hardware processors to: receive an image from a temporal set of images of at least a portion of one or more crops being monitored for a pre-defined event, wherein the pre-defined event relates to manifestation of diseases, manifestation of pests, count of one or more parts of the crop and growth stages; detect one or more Regions Of Interest (ROIs) as localized bounding boxes in the received image based on the pre-defined event using one or more context sensitive pre-trained models associated with the pre-defined event for the one or more crops being monitored, wherein the one or more ROIs correspond to a detected event; perform unsupervised segmentation of the one or more ROIs using a Convolutional Neural Network (CNN) to obtain a segmentation map having predicted labels based on spatial continuity of pixels comprised within each of the ROIs; obtain superpixels from the received image using a superpixel generating algorithm; and iteratively auto-correct the obtained segmentation map by: updating labels of the pixels in the one or more ROIs using boundaries of the obtained superpixels; computing a cross entropy loss between the predicted labels by a last convolution layer of the CNN and the updated labels; and back propagating the computed cross entropy loss to the CNN, until a change in the cross entropy loss from a previous iteration is less than a predetermined threshold.

In yet another aspect, there is provided a computer program product comprising a non-transitory computer readable medium having a computer readable program embodied therein, wherein the computer readable program, when executed on a computing device, causes the computing device to: receive an image from a temporal set of images of at least a portion of one or more crops being monitored for a pre-defined event, wherein the pre-defined event relates to manifestation of diseases, manifestation of pests, count of one or more parts of the crop and growth stages; detect one or more Regions Of Interest (ROIs) as localized bounding boxes in the received image based on the pre-defined event using one or more context sensitive pre-trained models associated with the pre-defined event for the one or more crops being monitored, wherein the one or more ROIs correspond to a detected event; perform unsupervised segmentation of the one or more ROIs using a Convolutional Neural Network (CNN) to obtain a segmentation map having predicted labels based on spatial continuity of pixels comprised within each of the ROIs; obtain superpixels from the received image using a superpixel generating algorithm; and iteratively auto-correct the obtained segmentation map by: updating labels of the pixels in the one or more ROIs using boundaries of the obtained superpixels; computing a cross entropy loss between the predicted labels by a last convolution layer of the CNN and the updated labels; and back propagating the computed cross entropy loss to the CNN, until a change in the cross entropy loss from a previous iteration is less than a predetermined threshold.

In accordance with an embodiment of the present disclosure, the pre-defined event relates to manifestation of diseases, manifestation of pests, count of one or more parts of the crop and growth stages.

In accordance with an embodiment of the present disclosure, the step of detecting the one or more ROIs in the received image is preceded by preprocessing of the received image, wherein the preprocessing comprises one or more of normalization of image data, resizing, Principal Components Analysis (PCA) whitening, brightness correction, histogram equalization, contrast stretching, de-correlation stretching and denoising.

In accordance with an embodiment of the present disclosure, the CNN is configured to be a Fully Convolutional Network (FCN), a 2 Dimensional (20) CNN, a 3 Dimensional (3D) CNN or in the form of blocks of CNN.

In accordance with an embodiment of the present disclosure, the step of performing unsupervised segmentation of the one or more ROIs comprises: computing features in the one or more ROIs, by the CNN, based on properties including color, edges, texture and the spatial continuity of the pixels comprised therein; labeling the pixels in the one or more ROIs based on the computed features such that (i) pixels with identical features are assigned a common label, (ii) spatially continuous pixels are assigned a common label; and (iii) a pre-defined number of potential unique labels is selected to account for each segment of the one or more ROIs; and obtaining the segmentation map having one or more segments, wherein each of the one or more segments being assigned a unique label.

In accordance with an embodiment of the present disclosure, the step of performing unsupervised segmentation of the one or more ROIs is followed by post processing the segmentation map using Conditional Random Fields (CRFs) to refine the boundaries of the one or more segments comprised in the segmentation map.

In accordance with an embodiment of the present disclosure, the step of updating labels of the pixels in the one or more ROIs using boundaries of the obtained superpixels comprises: determining a label represented by a maximum number of pixels in the segmentation map within a boundary associated with each of a corresponding superpixel in the received image; and updating the label assigned to all the pixels in the segmentation map within each of the corresponding superpixel with the determined label.

In accordance with an embodiment of the present disclosure, the method further comprises: updating weights of the CNN based on the updated labels in each iteration of the auto-correction of the obtained segmentation map; identifying the CNN at the end of the iterative auto-correction of the obtained segmentation map as a new pre-trained model; and updating a model library comprising the one or more pre-trained models with the new pre-trained model, wherein each of the one or more pre-trained models is associated with a corresponding architecture definition.

In accordance with an embodiment of the present disclosure, the method further comprises one or more of: localizing the detected event to one or more segments of interest from the one or more segments comprised in the auto-corrected segmentation map by analyzing the auto-corrected segmentation map for the detected event based on presence or absence of one or more features in the one or more segments comprised therein, wherein the one or more features include brightness, chromaticity, concentration of the pixels, gray scale differences, hue values and contrast: and computing an extent of the detected event based on number of pixels corresponding to the detected event and the total number of pixels in a corresponding one or more segments of interest.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

State of the art techniques for event detection by image segmentation are supervised. Supervised methods require ground truth labels of the segments at pixel level in a large number of the images for training a neural network which can be used for similar kind of images on which the network is trained. Convolutional Neural Network (CNN) based models are trained on annotated data of images captured with similar resolution, same lighting and background conditions in the lab. In a real scenario, images are captured in an uncontrolled environment with different backgrounds, occlusions, overlap and lighting conditions. Parts of plants have reasonable amount of variations especially in different growth stages. Variations in crops at different stages and multiple manifestations of a disease or pests in different sizes make annotations and data collection a time consuming task. The present disclosure provides an unsupervised method to address unavailability of labeled information in detail and in abundance in order to identify an event and assess the extent of manifestation of that event. Particularly, the methods of the present disclosure work with images captured from ground or aerial cameras (such as drones), with or without their Global Positioning System (GPS) locations and without a need for the images to be of a particular size or resolution since fully convolutional neural networks are employed. In accordance with the present disclosure, information of spatial continuity in pixels and boundaries in a given image are used to update feature representation and label assignment to every pixel using CNN based models.

The methods and systems of the present disclosure may find practical application in identifying and localizing plants and parts of a plant in an image, classifying parts and plants into their type as well as possible health state and growth stage. Such detected plants, plant parts and occurrences of events on the plant can be counted. An extent (such as severity) of manifestation of an event (such as a disease), size of the event (such as fruit size) as well as temporal change of these events may be estimated in terms of percentage of pixels.

In accordance with the present disclosure, all possible segments are obtained from a received image based on pixel features in an unsupervised manner. These segments are then further used for inferring events and extent of the inferred events. The features are different for every image and generally dependent on color, edges and texture of pixel groups in the image. Such groups of pixels with similar features constitute a segment whose label is unknown in the method of the present invention. The features are calculated using CNN.

Consider $\{x_n \in R^d\}_{n=1}^{N}$ as a d-dimensional feature vector of a received image 1 with $\{p_n \in R^3\}_{n=1}^{N}$ pixels and let $\{l_n \in Z\}_{n=1}^{N}$ be the segment label assignment for each pixel where N is the total number of pixels in the image. The task of getting this unknown number of labels for every pixel may be formulated as $l_n = f(x_n)$, where $f:R^d \to Z$ is the cluster assignment function. For a fixed $x_n$, $f$ is expected to give the best possible labels $l_n$. When the neural network is trained to learn $x_n$ and $f$ for a fixed and known set of labels $l_n$, it is a supervised classification. In accordance with the present disclosure, an unknown segmentation map is predicted while iteratively updating the function $f$ and the features $x_n$. Effectively, a joint optimization is achieved as given below:

Predicting the optimal $l_n$ for an updated $x_n$ and $f$

Training the parameters of the neural network to get $x_n$ and $f$ for the fixed $l_n$.

Humans tend to create segments according to common salient properties of objects or patches in an image like colors, texture, shape. The methods of the present disclosure, applies the same technique during segmentation, wherein spatially continuous pixels having similar properties are grouped into a same class or label. Also, different labels are assigned to the pixels having different features. In accordance with the present disclosure, pixels are labeled based on three criteria: (i) pixels with identical features are assigned a common label, (ii) spatially continuous pixels are assigned a common label; and (iii) a pre-defined number of potential unique labels is selected to account for each segment of the one or more ROIs, wherein the pre-defined number is typically a randomly selected large number, say, 100 to ensure not even a smallest segment is missed.

In accordance with an embodiment of the present disclosure, the d-dimensional feature vector $\{x_n\}_{n=1}^{N}$ is calculated for the pixels of the image 1 using a fully convolutional network architecture built using locally connected layers such as convolution and pooling. The down-sampling path in the neural network architecture captures the semantic information within the image and the up-sampling path helps to recover the spatial information. A plurality of blocks of convolutional layers followed by pooling are used to calculate the features. The output after these convolutional layers is termed as the feature vector or feature-map $\{x_n\}_{n=1}^{N}$ of the image 1 and represented as $\{x_n = W_c p_n + b_c\}_{n=1}^{N}$, where $W_c$ represents a multiplier resulting from weights of the convolutional layers and $b_c$ represents an additive term in the form of a bias and $\{p_n\}_{n=1}^{N}$ denotes the RGB pixel values of the image with total number of N pixels. After these convolutional blocks, the last convolution layer 1×1×M fully convolutional layers are used for classification of the pixels into different clusters, where M may be considered as the maximum number of potential unique labels in which the pixels may be clustered. A response map of this layer may be denoted as $\{W_{op} x_n + b_{op}\}_{n=1}^{N}$, where $W_{op}$ represents weights as a multiplier and $b_{op}$ represents the additive bias term. After applying the batch normalization, the response map $\{y_n \in R^M\}_{n=1}^{N}$ is obtained that has M dimensional vector of values with zero mean and unit variance for every pixel in the image. This helps to achieve a higher number of clusters, thus satisfying the third criterion of labeling pixels in accordance with the present disclosure. The index of the value that is maximum in $\{y_n\}_{n=1}^{N}$ may be considered as the label for the $n^{th}$ pixel. It may be obtained by connecting an argmax layer at the output of the neural network. The total number of unique segments or the labels in an image are between 1 to M and is determined by the image content and training of the neural network at every iteration. Since the convolutional networks are known to learn generalized features in the images well, the first criterion of assigning same cluster label to same pixels is satisfied. A post processing step of using Conditional Random Fields (CRFs) on the map of cluster labels help in increasing the segmentation accuracy of refining boundaries.

In accordance with an embodiment of the present disclosure, the neural network self-trains in order to segment the image into certain number of clusters. After making the inference at every iteration, a normalized cut method is applied on the input image to obtain a superpixel output. In accordance with an embodiment of the present disclosure, Region Adjacency Graph (RAG) along with Normalized Cut method is used on the image. Any superpixel algorithm may be used to obtain an over segmented map of the input image. The superpixel level output of the normalized cut method applied on the input image is used to update the cluster assignment $\{l_{new_n}\}_{n=1}^{N}$ of pixels in every superpixel denoted by $\{S_k\}_{k=1}^{K}$, K being the total number of superpixels. The updated cluster assignments are then used for back propagation to train the neural network. A cross entropy loss is calculated between the response-map $\{y_n \in R^M\}_{n=1}^{N}$ and the superpixel refined cluster assignment (labels) $\{l_{new_n}\}_{n=1}^{N}$ and then back propagated to update weights of the convolutional neural network for say t iterations, wherein the number of iterations t continues until a change in cross entropy loss from a previous iteration reduces below a predetermined threshold, say $\varepsilon = 0.0001$. Accordingly, a change in cross entropy loss decides whether a $(t+1)^{th}$ iteration is required to be performed, wherein an absolute difference ε between the value of cross entropy loss between the $t^{th}$ and the $(t-1)^{th}$ iterations being less than say 0.0001 results in end of the iterative process. Using superpixels helps to compute features on more meaningful regions and helps to get disjoint partitions of the input image and preserve image boundaries. Use of superpixels also results in reduced number of iterations. Again, every superpixel is expected to represent connected sets of pixels. This helps to satisfy the second criterion of assigning labels, wherein spatially continuous pixels form part of the same segment. Here, training of the neural network involves learning of parameters $\{W_c, b_c\}$ of the convolutional layers of the neural network that contributes in getting image features and also $\{W_{op}, b_{op}\}$, the parameters of output 1×1×M layer used to get a cluster map for each pixel. This is referred to as label updation or feature updation in step 10 of Algorithm 1 below.

Unsupervised segmentation, in accordance with an embodiment of the present disclosure may be represented in the form of Algorithm 1 as given below:

---
Algorithm 1: Unsupervised segmentation
---

Input: $I = \{p_n\}_{n=1}^N$ in $R^3$
Output: Labels $l_n{}_{n=1}^N$
1. $\{S_k\}_{k=1}^K \leftarrow$ NormCut($\{p_n\}_{n=1}^N$)
2. while $|loss_t - loss_{t-1}| > \varepsilon$: do
3.     $\{x_n\}_{n=1}^N \leftarrow$ GetFeatures(I, $\{W_c, b_c\}$)
4.     $\{y_n\}_{n=1}^N \leftarrow$ BatchNorm($W_{op} * x_n + b_{op}$)
5.     $\{l_n\}_{n=1}^N \leftarrow$ argmax($\{y_n\}_{n=1}^N$)
6.     $\{l_n\}_{n=1}^N \leftarrow$ CRF($\{l_n\}_{n=1}^N$, $\{p_n\}_{n=1}^N$)
7.     for i from 1 to K: do
8.       $l_{new_n} \leftarrow$ argmax$|l_n|\forall n \in S_k$
9.     $loss_{t+1} \leftarrow$ CrossEntropy($\{y_n, l_{new_n}\}_{n=1}^N$)
10.    $\{W_c, b_c, W_{op}, b_{op}\} \leftarrow$ UpdateFeatures(loss)
11.    $loss_t \leftarrow loss_{t+1}$ Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

Figure 1:
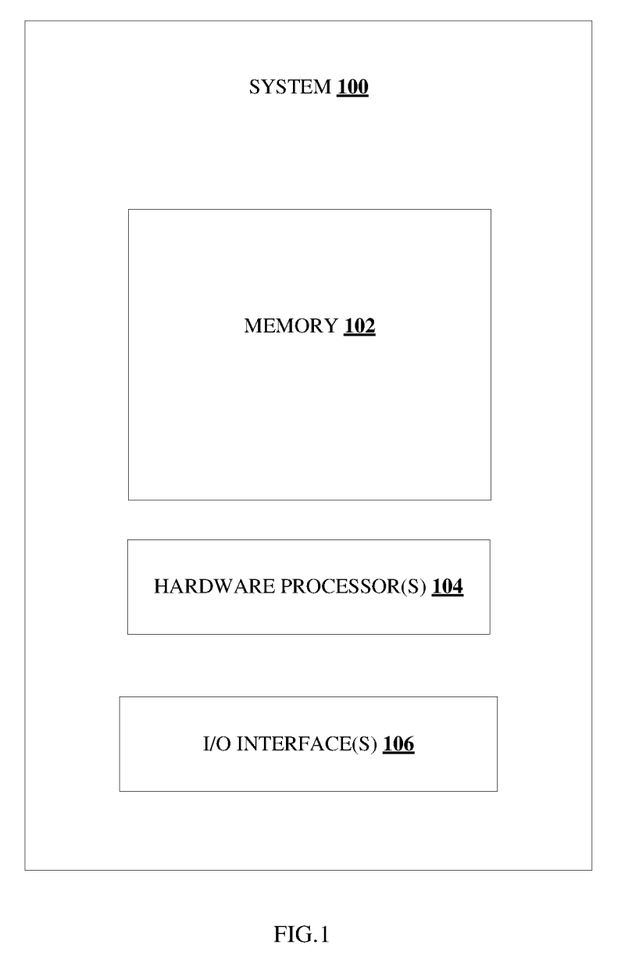
FIG. 1 illustrates an exemplary block diagram of a system for automated unsupervised localization of context sensitive events in crops and computing extent of the events, in accordance with an embodiment of the present disclosure.

FIG. 1 illustrates an exemplary block diagram of a system 100 for automated unsupervised localization of context sensitive events in crops and computing extent of the events, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

FIG. 2A through FIG. 2D illustrates an exemplary flow diagram of a computer implemented method 200 for automated unsupervised localization of context sensitive events in crops and computing extent of the events, in accordance with an embodiment of the present disclosure. In an embodiment, the system 100 includes one or more data storage devices or memory 102 operatively coupled to the one or more processors 104 and is configured to store instructions configured for execution of steps of the method 200 by the one or more processors 104. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the method 200 comprises two parts, wherein a first part is related to segmentation of an image captured in an uncontrolled environment in an unsupervised manner using CNN followed by auto-correction of an obtained segmentation map by back propagating pixel labels modified according to the output of a graph based method that helps the neural network to converge and provide a time efficient solution. A second part of the method 200 is related to detecting context sensitive events using the auto-corrected segmentation map and estimating an extent of the detected context sensitive events.

Figure 2A:
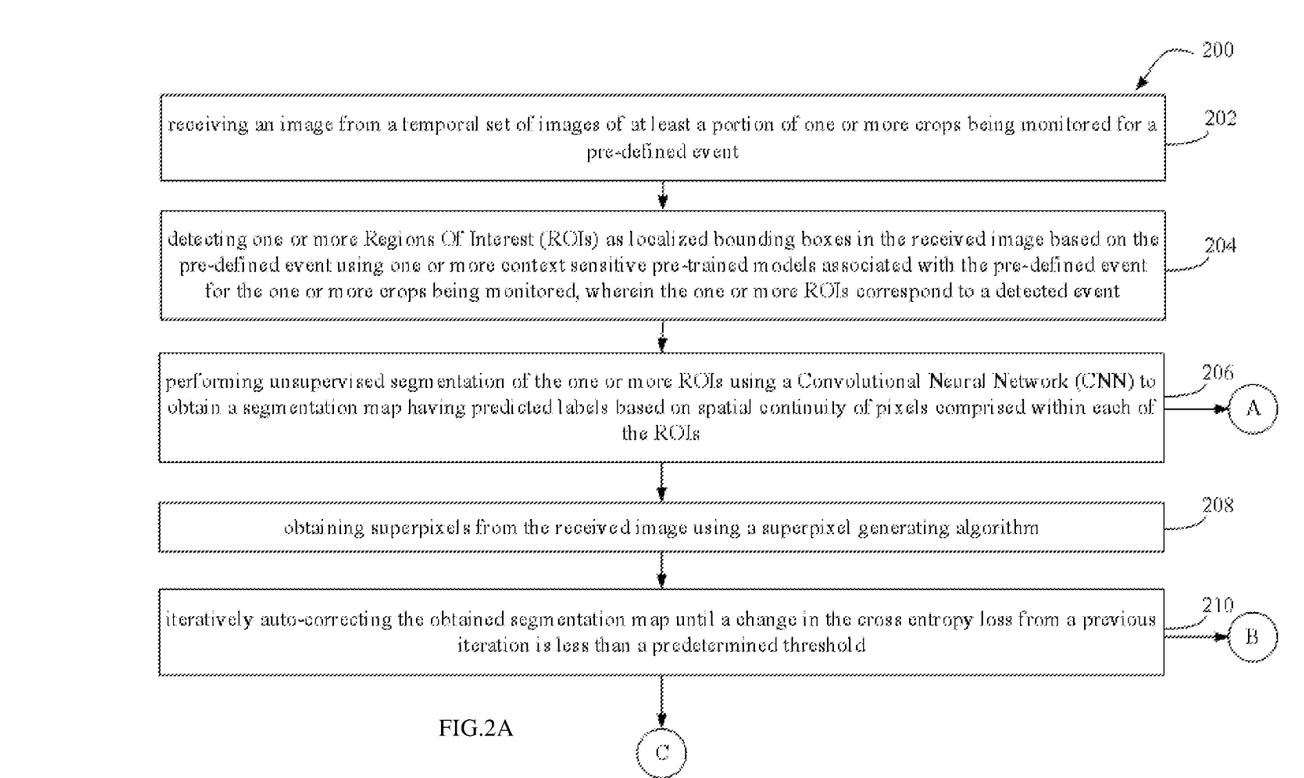
FIG. 2A through FIG. 2D illustrates an exemplary flow diagram of a computer implemented method for automated unsupervised localization of context sensitive events in crops and computing extent of the events, in accordance with an embodiment of the present disclosure.

In accordance with an embodiment of the present disclosure, for achieving the first part of the method 200, the one or more processors 104 are configured to receive, at step 202, an image from a temporal set of images of at least a portion of one or more crops being monitored for a pre-defined event. In an embodiment, the pre-defined event relates to manifestation of diseases, manifestation of pests, count of one or more parts of the crop (such as fruits) and growth stages for an agricultural context. In real scenarios, the received image may be captured in different lighting and background conditions in an uncontrolled environment. The images may need to be preprocessed for brightness correction. Accordingly, in an embodiment, preprocessing of the received image may be performed, wherein the preprocessing comprises one or more of normalization of image data, resizing, Principal Components Analysis (PCA) whitening, brightness correction, histogram equalization, contrast stretching, de-correlation stretching and denoising.

In accordance with an embodiment of the present disclosure, the one or more processors 104 are configured to detect, at step 204, one or more Regions Of Interest (ROIs) as localized bounding boxes in the received image based on the pre-defined event using one or more context sensitive pre-trained models associated with the pre-defined event for the one or more crops being monitored, wherein the one or more ROIs correspond to a detected event. For instance, the ROIs may depend on an event like detecting a disease affected area in the crop or a pest affecting the crop. In accordance with the present disclosure, the one or more pre-trained models are comprised in a model library, wherein each of the one or more pre-trained models is associated with a corresponding architecture definition. There may be a common architecture definition for several pre-trained models even though they represent say, different diseases. Likewise, a same disease may be represented by pre-trained models having different architecture definitions.

Figure 2B:
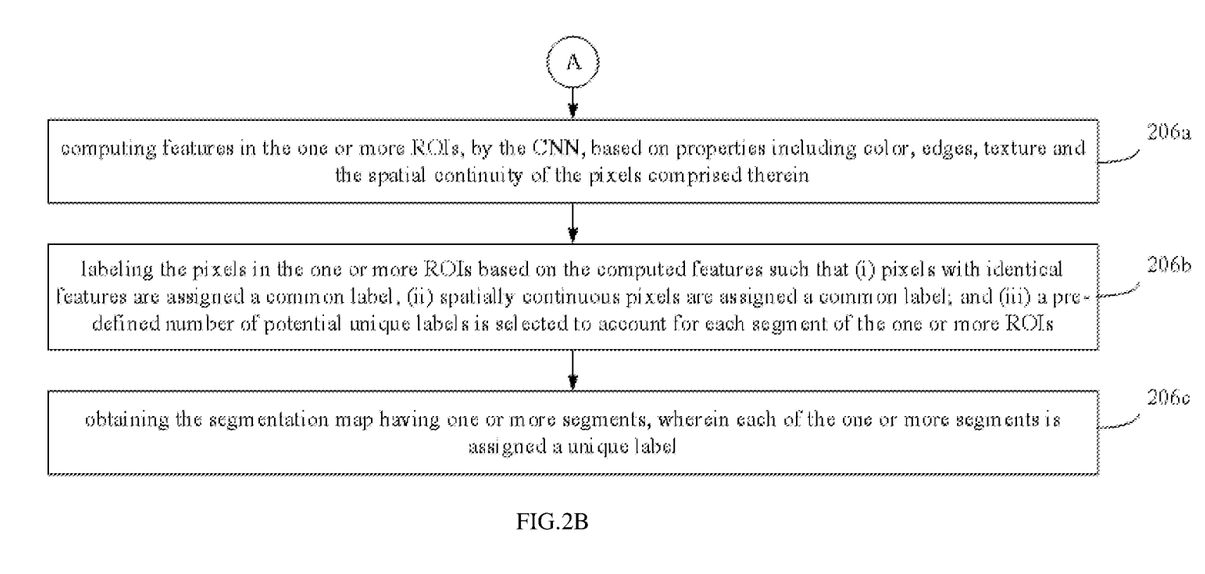

In accordance with an embodiment of the present disclosure, the one or more processors 104 are configured to perform unsupervised segmentation, at step 206, of the one or more ROIs using a CNN to obtain a segmentation map having predicted labels based on spatial continuity of pixels comprised within each of the ROIs. In an embodiment, the CNN is configured to be a Fully Convolutional Network (FCN), a 2 Dimensional (2D) CNN, a 3 Dimensional (3D) CNN or in the form of blocks of CNN. As described above, the step of performing unsupervised segmentation of the one or more ROIs comprises: at step 206a computing features in the one or more ROIs, by the CNN, based on properties including color, edges, texture and the spatial continuity of the pixels comprised in the ROIs; at step 206b labeling the pixels in the one or more ROIs based on the computed features such that the three criteria for labeling described above are satisfied; and at step 206c obtaining the segmentation map having one or more segments, wherein each of the one or more segments is assigned a unique label. In an embodiment, as described above, the step of performing unsupervised segmentation of the one or more ROIs may be followed by post processing the segmentation map CRFs to refine the boundaries of the one or more segments comprised in the segmentation map.

In accordance with an embodiment of the present disclosure, the one or more processors 104 are configured to obtain superpixels, at step 208, from the received image using a superpixel generating algorithm. In an embodiment, the step of obtaining superpixels is followed by generating a region adjacency graph. In an embodiment, the region adjacency graph is generated using a normalized cut method.

Figure 2C:
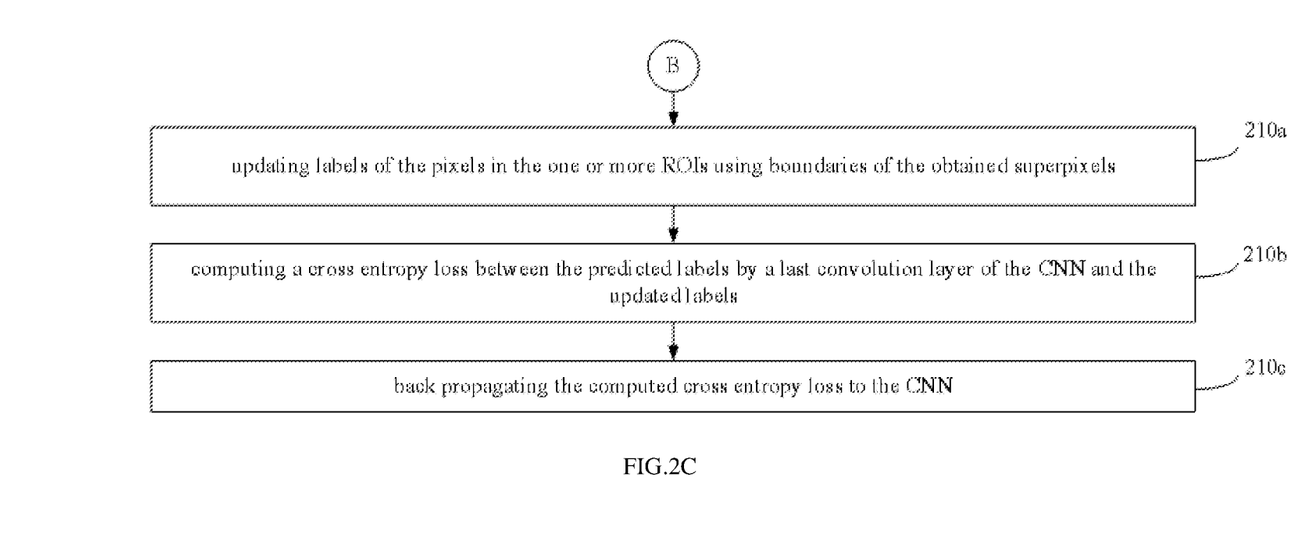

In accordance with an embodiment of the present disclosure, the one or more processors 104 are configured to iteratively auto-correct the obtained segmentation map, at step 210. In accordance with the present disclosure, the step of auto-correction comprises firstly updating labels of the pixels in the one or more ROIs using boundaries of the obtained superpixels at step 210a. A cross entropy loss is then calculated, at step 210b, between the predicted labels by a last convolution layer of the CNN and the updated labels. At step 210c, the computed cross entropy loss is back propagated to the CNN. The iterative auto-correction continues until a change in the cross entropy loss from a previous iteration is less than a predetermined threshold that may be heuristically determined.

In accordance with an embodiment of the present disclosure, the step of updating labels of the pixels in the one or more ROIs using boundaries of the obtained superpixels comprises determining a label represented by a maximum number of pixels in the segmentation map within a boundary associated with each of a corresponding superpixel in the received image; and updating the label assigned to all the pixels in the segmentation map within each of the corresponding superpixel with the determined label.

In accordance with an embodiment of the present disclosure, the one or more processors 104 are configured to obtain update weights of the CNN, at step 212, based on the updated labels in each iteration of the auto-correction of the obtained segmentation map. The CNN having updated weights at the end of the iterative auto-correction of the obtained segmentation map is then identified as a new pre-trained model at step 214. In an embodiment, at step 216, the model library is updated with the new pre-trained model obtained after auto-correction of the obtained segmentation map.

Figure 2D:
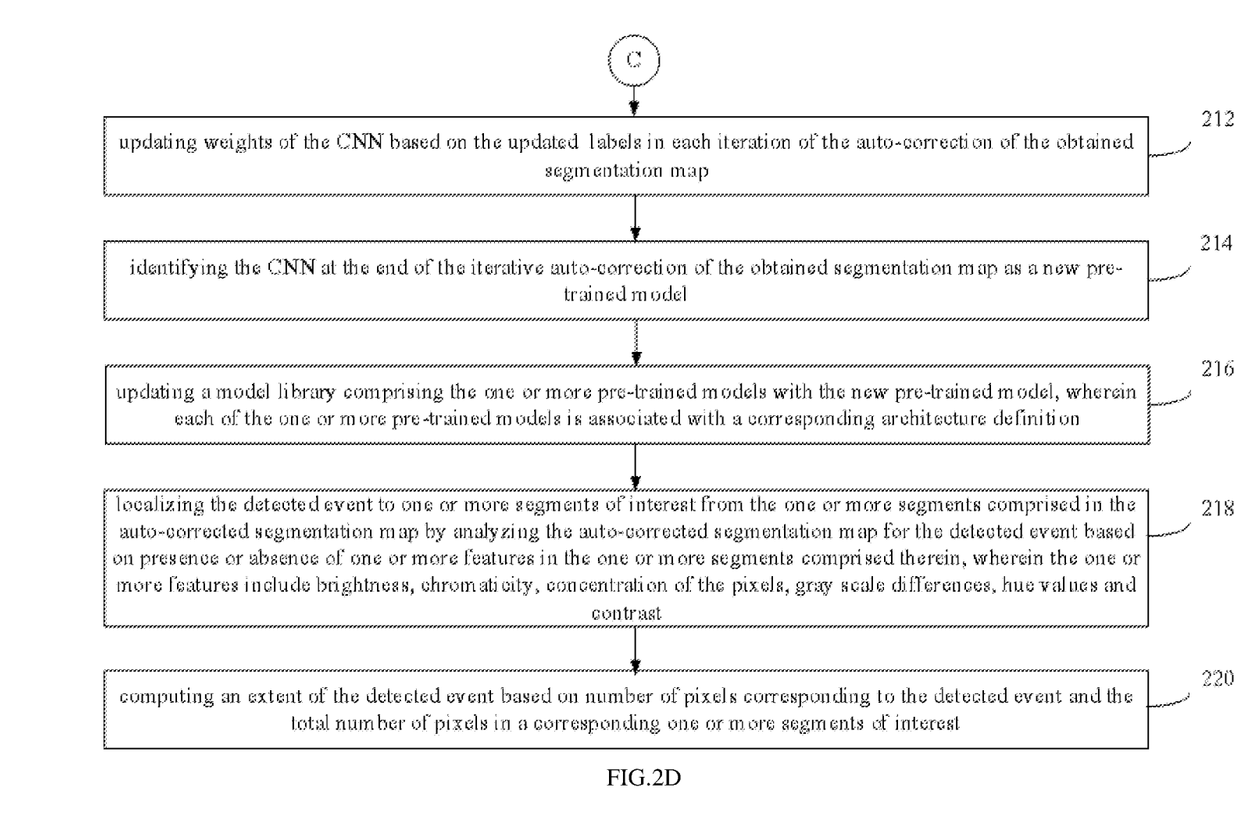

Once the auto-corrected segmentation map is obtained, segments corresponding to the detected event need to be identified. Accordingly, in an embodiment of the present disclosure, for achieving the second part of the method 200, the one or more processors 104 are configured to localize the detected event, at step 218, to one or more segments of interest from the one or more segments comprised in the auto-corrected segmentation map by analyzing the auto-corrected segmentation map for the detected event based on presence or absence of one or more features in the one or more segments comprised therein, wherein the one or more features include brightness, chromaticity, concentration of the pixels, gray scale differences, hue values and contrast. For instance, if there is any temporal information in the images received from a stationary camera, emergence of a new segment itself may be an indication of an event like flowering or a disease manifestation. In an image, if a segment has a different feature or characteristic like color, texture, etc. yellow, brown or black pixels inside a leaf, the leaf has a high probability of being disease/pest affected. If the kind of crop and possible diseases are already known, the properties of a particular disease manifestation can be compared with the resulting segments. Instead of presence of a certain feature like color or texture, the absence of the same may also flag a change. For example, absence of a particular hue or chromaticity of pixel values on the segment corresponding to a leaf, flags occurrence of some deficiency or disease e.g. light green color of leaves due to lack of fertilizer. Alternatively, absence of certain amount of density of required green pixels in the segment may indicate slower growth of a plant.

Pests and diseases contribute to some of the largest losses in crop yield around the globe. Moreover, due to lack of knowledge, chemicals are applied either at a wrong growth stage or in wrong quantities. The diseases and pests may be detected, but the idea of severity and stage is necessary to take actions at a correct point of time. Measuring the diseased region out of the image gives an idea of severity and hence the quantity of the pesticide. Accordingly, in an embodiment of the present disclosure, the one or more processors 104 are configured to compute, at step 220, an extent of the detected event based on number of pixels corresponding to the detected event and the total number of pixels in a corresponding one or more segments of interest. The step 220 may be represented as:

$$\text{Extent} = \frac{\sum \text{Number of pixels} \in \{c_{ij}\}_{i=1}^{nc}}{\text{Total pixels} \in c_j},$$

wherein nc represents the total number of segments representing the detected event, i represents number of the segment representing the detected event and j represents the number of the segment of interest.

For example, in case of Helopeltis pest in Tea leaves, pixels that belong to all the nc labels that have pixels of brown value and inside the leaf boundary, i.e. surrounded by pixels with green value are the set of pixels representing pest on the leaves. In this example scenario, the ROIs can be the whole plant, individual leaves of the plant or multiple/canopy of plants in a single image.

In an embodiment, once the ROIs are detected, based on the kind of event and ROIs, the number of bounding boxes may be used to get an estimate of the instances (count) of the event in the image. For example, detection of leaves on a plant gives an idea of number of leaves on that plant. Moreover, detection of diseased leaves also gives a proportion of leaves that have been infected on a particular plant.

Figure 3:
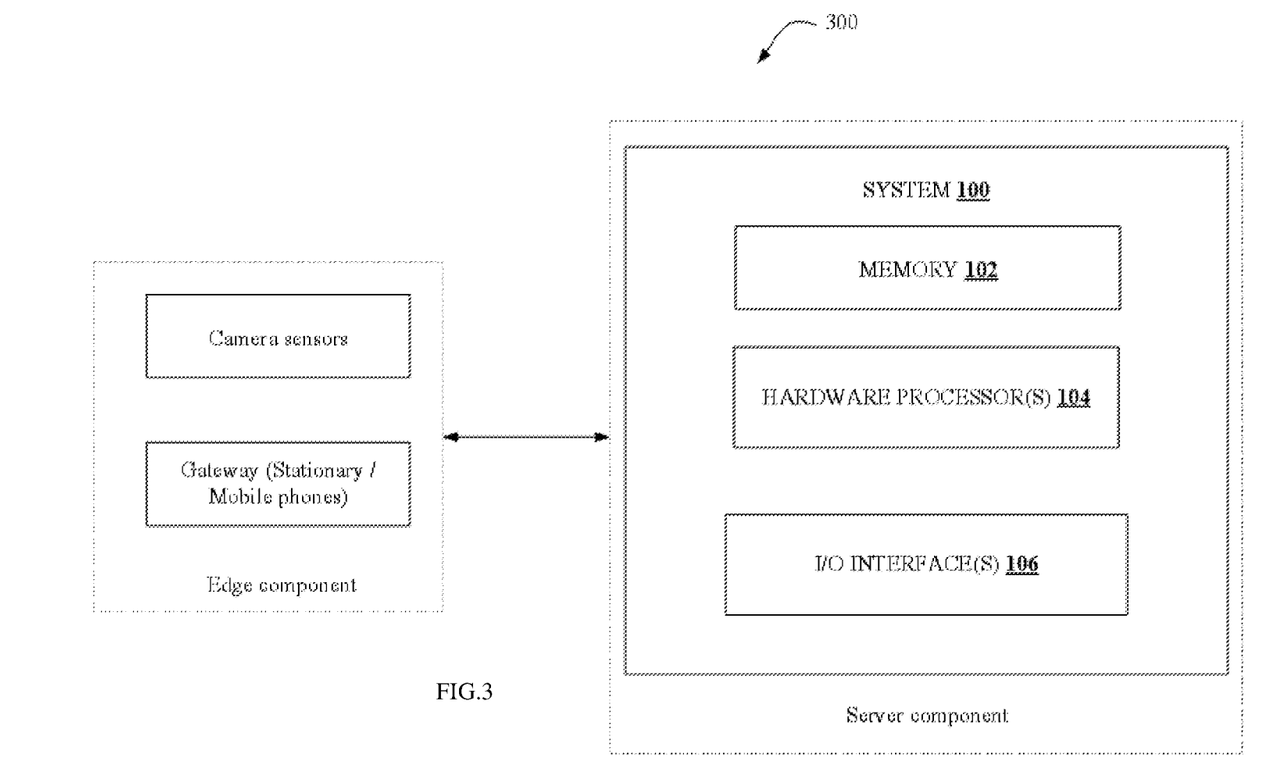
FIG. 3 illustrates an exemplary architecture for the system of FIG. 1, in accordance with an embodiment of the present disclosure.

In an embodiment, the one or more processors 104 may constitute either a cloud component of a distributed system or an edge component (an IoT gateway or a mobile device) of a distributed system. In another embodiment, the model library is hosted on the cloud component and the edge component of the distributed system. FIG. 3 illustrates an exemplary architecture 300 for the system of FIG. 1, in accordance with an embodiment of the present disclosure. In the exemplary architecture of FIG. 3, the system 100 constitutes the cloud component with the model library hosted therein. The pre-trained models are used for inferencing images on the edge component where computation resource may be limited. Accordingly, in an embodiment, the pre-trained models in the model library may be deployed to the edge devices for making offline image inferences for real time crop monitoring. The inferences are also sent with the received images to the model library on availability of connection.

In an embodiment of the present disclosure, a user interface may be provided where an agricultural expert may view the images and all the inferences generated by the pre-trained models. The agricultural expert may correct the detected Region Of Interest (ROI) or the predicted labels or segments and ROI boundaries. Such corrected meta-information of the images may be used to fine-tune the pre-trained models used for detecting the ROIs.

Results

In an experimental setup, a neural network with 4 convolutional layers was used. The last convolutional layer was 1×1×50 where 50 represents maximum potential labels. CRF was used as a post processing step for refining the segments. The over segmented map for the final step of refined cluster (label) assignment was obtained using the Normalized cut over the RAG of the image. Cross-entropy loss between the predicted labels of the last convolutional layer and the updated labels was calculated for back propagation. Stochastic gradient descent with learning rate of 0.01 and momentum of 0.9 was used to train the neural network for T=500 iteration. The segmentation performance was evaluated using the measure in Equation 1 below:

$$A(l_n, gt_n) = \frac{\text{Number of correct } l_n}{N} \forall n \in [1, N] \quad \text{Equation 1}$$

wherein A denotes the accuracy of the predicted labels $l_n$ for all pixels with respect to the ground truth labels $\{gt_n\}_{n=1}^{N}$ and is defined by a ratio of correctly predicted pixels to the total number of pixels N in the image.

The method of the present disclosure was applied for images of different crops to obtain optimal number of clusters and segments. The color of every segment obtained is the average of the RGB values of pixels assigned to that particular segment label. 4 segments (unique labels or clusters) were obtained in Variegated Balfour Aralia with 92% accuracy, 3 segments were obtained in Dracaena, 7 segments in Tea with 81% accuracy, 6 segments in Cabbage with 94% accuracy, 9 segments in Pomegranate with 67% accuracy, 6 segments in Citrus with 93% accuracy. Considering the trade-off between the number of segments and the way pixels are labeled, more the number of segments, better is the detection of change in an image for precision monitoring. In the experiments performed, segments of interest were successfully obtained in all the images, i.e. yellow segments in Aralia and Dracaena, black region in cabbage due to Black Moth, brown regions in Tea and Pomegranate due to attack of Helopeltis and Anthracnose respectively, as well as appearance of a fruit in a Citrus tree. The methods and systems of the present disclosure obviates the disadvantages of the conventional techniques for labeling such as (i) need for finding the correct features that help in getting the correct labels and (ii) need to specify the desired number of clusters as input along with the image. The conventional methods are also sensitive to imaging conditions like light exposure and clarity. Eliminating the constraint by hand coded features also helps automating and generalizing the method of the present disclosure.

Once the image is satisfactorily segmented in accordance with part one of the method 200 of the present disclosure, various computer vision methods may be applied apart from those indicated in part two above to achieve maximal automation in precision agriculture.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method comprising the steps of:
   receiving, by one or more processors, an image from a temporal set of images of at least a portion of one or more crops being monitored for a pre-defined event;
   detecting one or more Regions Of Interest (ROIs), by the one or more processors, as localized bounding boxes in the received image based on the pre-defined event using one or more context sensitive pre-trained models associated with the pre-defined event for the one or more crops being monitored, wherein the one or more ROIs correspond to a detected event;
   performing unsupervised segmentation of the one or more ROIs, by the one or more processors, using a Convolutional Neural Network (CNN) to obtain a segmentation map having predicted labels based on spatial continuity of pixels comprised within each of the ROIs;
   obtaining superpixels from the received image, by the one or more processors, using a superpixel generating algorithm; and
   iteratively auto-correcting, by the one or more processors, the obtained segmentation map by:
      updating labels of the pixels in the one or more ROIs using boundaries of the obtained superpixels by using unsupervised segmentation and computing features on one or more regions from the received image to obtain disjoint partitions of the received image;
      computing a cross entropy loss between the predicted labels by a last convolution layer of the CNN and the updated labels;
      back propagating the computed cross entropy loss to the CNN,
   until a change in the cross entropy loss from a previous iteration is less than a predetermined threshold;
   updating weights of the CNN based on the updated labels in each iteration of the auto-correction of the obtained segmentation map;
   identifying the CNN at the end of the iterative auto-correction of the obtained segmentation map as a new pre-trained model; and
   updating a model library comprising the one or more pre-trained models with the new pre-trained model, wherein each of the one or more pre-trained models is associated with a corresponding architecture definition, and
   inferencing one or more images by the one or more pre-trained models on an edge component where computation resources are limited and deploying the one or more pre-trained models in a model library for making offline image inferences, and the offline image inferences are sent with one or more received images to the model library on availability of a connection.

2. The processor implemented method of claim 1, wherein the pre-defined event relates to manifestation of diseases, manifestation of pests, count of one or more parts of the crop and growth stages.

3. The processor implemented method of claim 1, wherein the step of detecting the one or more ROIs in the received image is preceded by preprocessing of the received image, wherein the preprocessing comprises one or more of normalization of image data, resizing, Principal Components Analysis (PCA) whitening, brightness correction, histogram equalization, contrast stretching, de-correlation stretching and denoising.

4. The processor implemented method of claim 1, wherein the CNN is configured to be a Fully Convolutional Network (FCN), a 2-Dimensional (2D) CNN, a 3-Dimensional (3D) CNN or in the form of blocks of CNN.

5. The processor implemented method of claim 1, wherein the step of performing unsupervised segmentation of the one or more ROIs comprises:
   computing features in the one or more ROIs, by the CNN, based on properties comprising color, edges, texture and the spatial continuity of the pixels comprised therein;
   labeling the pixels in the one or more ROIs based on the computed features such that (i) pixels with identical features are assigned a common label, (ii) spatially continuous pixels are assigned a common label; and
(iii) a pre-defined number of potential unique labels is selected to account for each segment of the one or more ROIs; and
obtaining the segmentation map having one or more segments, wherein each of the one or more segments is assigned a unique label.

6. The processor implemented method of claim 1, wherein the step of performing unsupervised segmentation of the one or more ROIs is followed by post processing the segmentation map using Conditional Random Fields (CRFs).

7. The processor implemented method of claim 1, wherein the step of obtaining superpixels is followed by generating a region adjacency graph.

8. The processor implemented method of claim 7, wherein the region adjacency graph is generated using a normalized cut method.

9. The processor implemented method of claim 1, wherein the step of updating labels of the pixels in the one or more ROIs using boundaries of the obtained superpixels comprises:
determining a label represented by a maximum number of pixels in the segmentation map within a boundary associated with each of a corresponding superpixel in the received image; and
updating the label assigned to all the pixels in the segmentation map within each of the corresponding superpixel with the determined label.

10. The processor implemented method of claim 1 further comprising one or more of:
localizing the detected event to one or more segments of interest from the one or more segments comprised in the auto-corrected segmentation map by analyzing the auto-corrected segmentation map for the detected event based on presence or absence of one or more features in the one or more segments comprised therein, wherein the one or more features include brightness, chromaticity, concentration of the pixels, gray scale differences, hue values and contrast; and
computing an extent of the detected event based on number of pixels corresponding to the detected event and a total number of pixels in a corresponding one or more segments of interest.

11. The processor implemented method of claim 10, wherein the extent of detected event is represented as:

$$\text{Extent} = \frac{\sum \text{Number of pixels} \in \{c_{ij}\}_{i=1}^{nc}}{\text{Total pixels} \in c_j},$$

wherein nc represents a total number of segments representing the detected event, i represents number of the segment representing the detected event and j represents a number of the segment of interest.

12. A system comprising:
one or more data storage devices operatively coupled to one or more hardware processors and configured to store instructions configured for execution by the one or more hardware processors to:
receive an image from a temporal set of images of at least a portion of one or more crops being monitored for a pre-defined event, wherein the pre-defined event relates to manifestation of diseases, manifestation of pests, count of one or more parts of the crop and growth stages;
detect one or more Regions Of Interest (ROIs) as localized bounding boxes in the received image based on the pre-defined event using one or more context sensitive pre-trained models associated with the pre-defined event for the one or more crops being monitored, wherein the one or more ROIs correspond to a detected event;
perform unsupervised segmentation of the one or more ROIs using a Convolutional Neural Network (CNN) to obtain a segmentation map having predicted labels based on spatial continuity of pixels comprised within each of the ROIs;
obtain superpixels from the received image using a superpixel generating algorithm; and
iteratively auto-correct the obtained segmentation map by:
updating labels of the pixels in the one or more ROIs using boundaries of the obtained superpixels;
computing a cross entropy loss between the predicted labels by a last convolution layer of the CNN and the updated labels; and
back propagating the computed cross entropy loss to the CNN,
until a change in the cross entropy loss from a previous iteration is less than a predetermined threshold;
update weights of the CNN based on the updated labels in each iteration of the auto-correction of the obtained segmentation map;
identify the CNN at the end of the iterative auto-correction of the obtained segmentation map as a new pre-trained model; and
update a model library comprising the one or more pre-trained models with the new pre-trained model, wherein each of the one or more pre-trained models is associated with a corresponding architecture definition, and
inference one or more images by the one or more pre-trained models on an edge component where computation resources are limited and deploying the one or more pre-trained models in a model library for making offline image inferences, and the offline image inferences are sent with one or more received images to the model library on availability of a connection.

13. The system of claim 12, wherein the one or more processors are further configured to preprocess the received image prior to detecting the one or more ROIs in the received image, wherein the preprocessing comprises one or more of normalization of image data, resizing, Principal Components Analysis (PCA) whitening, brightness correction, histogram equalization, contrast stretching, de-correlation stretching and denoising.

14. The system of claim 12, wherein the CNN is configured to be a Fully Convolutional Network (FCN), a 2-Dimensional (2D) CNN, a 3-Dimensional (3D) CNN or in the form of blocks of CNN.

15. The system of claim 12, wherein the one or more processors are further configured to perform one or more of:
unsupervised segmentation of the one or more ROIs by:
computing features in the one or more ROIs, by the CNN, based on properties comprising color, edges, texture and the spatial continuity of the pixels comprised therein;
labeling the pixels in the one or more ROIs based on the computed features such that (i) pixels with identical features are assigned a common label, (ii) spatially continuous pixels are assigned a common label; and (iii) a pre-defined number of potential unique labels is selected to account for each segment of the one or more ROIs; and obtaining the segmentation map having one or more segments, wherein each of the one or more segments is assigned a unique label;

post process the segmentation map using Conditional Random Fields (CRFs);

update labels of the pixels in the one or more ROIs using boundaries of the obtained superpixels by:

determining a label represented by a maximum number of pixels in the segmentation map within a boundary associated with each of a corresponding superpixel in the received image; and updating the label assigned to all the pixels in the segmentation map within each of the corresponding superpixel with the determined label;

localizing the detected event to one or more segments of interest from the one or more segments comprised in the auto-corrected segmentation map by analyzing the auto-corrected segmentation nna p for the detected event based on presence or absence of one or more features in the one or more segments comprised therein, wherein the one or more features include brightness, chromaticity, concentration of the pixels, gray scale differences, hue values and contrast;

compute an extent of the detected event based on number of pixels corresponding to the detected event and a total number of pixels in a corresponding one or more segments of interest.

16. The system of claim 15, wherein the one or more processors constitute either a cloud component of a distributed system or the edge component of a distributed system.

17. The system of claim 16 wherein the model library is hosted on the cloud component and the edge component of the distributed system.

18. A computer program product comprising a non-transitory computer readable medium having a computer readable program embodied therein, wherein the computer readable program, when executed on a computing device, causes the computing device to:

receive an image from a temporal set of images of at least a portion of one or more crops being monitored for a pre-defined event, wherein the pre-defined event relates to manifestation of diseases, manifestation of pests, count of one or more parts of the crop and growth stages;

detect one or more Regions Of Interest (ROIs) as localized bounding boxes in the received image based on the pre-defined event using one or more context sensitive pre-trained models associated with the pre-defined event for the one or more crops being monitored, wherein the one or more ROIs correspond to a detected event;

perform unsupervised segmentation of the one or more ROIs using a Convolutional Neural Network (CNN) to obtain a segmentation map having predicted labels based on spatial continuity of pixels comprised within each of the ROIs;

obtain superpixels from the received image using a superpixel generating algorithm; and iteratively auto-correct the obtained segmentation map by:

updating labels of the pixels in the one or more ROIs using boundaries of the obtained superpixels;

computing a cross entropy loss between the predicted labels by a last convolution layer of the CNN and the updated labels; and back propagating the computed cross entropy loss to the CNN, until a change in the cross entropy loss from a previous iteration is less than a predetermined threshold;

updating weights of the CNN based on the updated labels in each iteration of the auto-correction of the obtained segmentation map;

identifying the CNN at the end of the iterative auto-correction of the obtained segmentation map as a new pre-trained model; and updating a model library comprising the one or more pre-trained models with the new pre-trained model, wherein each of the one or more pre-trained models is associated with a corresponding architecture definition, and inferencing one or more images by the one or more pre-trained models on an edge component where computation resources are limited and deploying the one or more pre-trained models in a model library for making offline image inferences, and the offline image inferences are sent with one or more received images to the model library on availability of a connection.

19. The computer program product of claim 18, wherein the computer readable program further causes the computing device to:

perform unsupervised segmentation of the one or more ROIs by:

computing features in the one or more ROIs, by the CNN, based on properties comprising color, edges, texture and the spatial continuity of the pixels comprised therein;

labeling the pixels in the one or more ROIs based on the computed features such that (i) pixels with identical features are assigned a common label, (ii) spatially continuous pixels are assigned a common label; and (iii) a pre-defined number of potential unique labels is selected to account for each segment of the one or more ROIs; and obtaining the segmentation map having one or more segments, wherein each of the one or more segments is assigned a unique label;

post process the segmentation map using the Conditional Random Fields (CRFs);

update labels of the pixels in the one or more ROIs using boundaries of the obtained superpixels by:

determining a label represented by a maximum number of pixels in the segmentation map within a boundary associated with each of a corresponding superpixel in the received image; and updating the label assigned to all the pixels in the segmentation mapwithin each of the corresponding superpixel with the determined label;

localizing the detected event to one or more segments of interest from the one or more segments comprised in the auto-corrected segmentation map by analyzing the auto-corrected segmentation map for the detected event based on presence or absence of one or more features in the one or more segments comprised therein, wherein the one or more features include brightness, chromaticity, concentration of the pixels, gray scale differences, hue values and contrast; and compute an extent of the detected event based on number of pixels corresponding to the detected event and a total number of pixels in a corresponding one or more segments of interest.

\* \* \* \* \*